(12) United States Patent
Horii et al.

(10) Patent No.: US 8,163,416 B2
(45) Date of Patent: Apr. 24, 2012

(54) ELECTRONIC APPARATUS

(75) Inventors: Yasuyuki Horii, Tokyo (JP); Yuji Nakajima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1425 days.

(21) Appl. No.: 11/358,999

(22) Filed: Feb. 21, 2006

(65) Prior Publication Data

US 2006/0210866 A1 Sep. 21, 2006

(30) Foreign Application Priority Data

Mar. 17, 2005 (JP) ................. P2005-077709

(51) Int. Cl.
 *H01M 2/10* (2006.01)
 *H05K 7/14* (2006.01)
(52) U.S. Cl. ........... 429/99; 439/96; 439/97; 439/98; 439/100; 361/679.01; 361/679.02
(58) Field of Classification Search ........... 429/96–100; 361/679.01, 679.02
 See application file for complete search history.

(56) References Cited

U.S. PATENT DOCUMENTS

| | | | |
|---|---|---|---|
| 3,583,744 A | 6/1971 | Paine et al. | |
| 4,772,990 A * | 9/1988 | Linehan et al. | 362/183 |
| 5,272,598 A | 12/1993 | Kobayashi et al. | |
| 5,582,389 A | 12/1996 | Greene | |
| 5,583,744 A | 12/1996 | Oguchi et al. | |
| 6,078,496 A | 6/2000 | Oguchi et al. | |
| 6,159,632 A | 12/2000 | Osawa | |
| 6,160,702 A * | 12/2000 | Lee et al. | 361/679.32 |
| 6,410,184 B1 | 6/2002 | Horiuchi et al. | |
| 6,521,371 B1 | 2/2003 | Lavanture | |
| 6,560,100 B1 | 5/2003 | Shin et al. | |
| 6,617,063 B1 | 9/2003 | Ohnishi | |
| 6,811,921 B2 | 11/2004 | Dansui et al. | |
| 7,199,999 B2 | 4/2007 | Shin et al. | |
| 2003/0198845 A1 | 10/2003 | Nakanishi et al. | |
| 2005/0069739 A1 | 3/2005 | Ozeki | |
| 2006/0210869 A1 * | 9/2006 | Takeguchi et al. | 429/153 |
| 2006/0286449 A1 * | 12/2006 | Kishida | 429/178 |

FOREIGN PATENT DOCUMENTS

| | | | |
|---|---|---|---|
| JP | 05-205712 | | 8/1993 |
| JP | 05-205712 | | 9/1993 |
| JP | 10-222259 | | 8/1998 |
| JP | 2001-143673 | | 5/2001 |
| JP | 2002-091616 | | 3/2002 |
| JP | 2006218628 | * | 8/2006 |

OTHER PUBLICATIONS

Japanese Patent Application No. 2005-077709, Notification of Reasons for Refusal, mailed Apr. 6, 2010 (English translation).
United States Office Action dated Dec. 17, 2008 for U.S. Appl. No. 11/225,586, filed Sep. 13, 2005 entitled Battery Unit Having Case to Contain Cells.
United States Office Action dated Jul. 30, 2009 for U.S. Appl. No. 11/225,586, filed Sep. 13, 2005 entitled Battery Unit Having Case to Contain Cells.
Examiner's Answer dated Apr. 12, 2010 for U.S. Appl. No. 11/225,586, filed Sep. 13, 2005 entitled Battery Unit Having Case to Contain Cells.

* cited by examiner

*Primary Examiner* — Patrick Joseph Ryan
*Assistant Examiner* — Ladan Mohaddes
(74) *Attorney, Agent, or Firm* — Blakely, Sokoloff, Taylor & Zafman LLP

(57) ABSTRACT

According to one embodiment, a battery unit comprises a plurality of cells and a case to contain the cells. The case includes a first part to contain at least one cell, a second part to contain at least one cell, and a third part to connect the first and second parts. At least a portion of the third part is made thinner than the first and second parts.

13 Claims, 16 Drawing Sheets

ELECTRONIC APPARATUS

CROSS-REFERENCE TO RELATED APPLICATIONS

This application is based upon and claims the benefit of priority from Japanese Patent Application No. 2005-077709, filed on Mar. 17, 2005, the entire contents of which are incorporated herein by reference.

BACKGROUND

1. Field

Embodiments of the present invention relate to an electronic apparatus such as a portable computer equipped with a battery unit.

2. Description of the Related Art

A portable computer has a battery unit as a power source. The battery unit has cells and a case to contain the cells. The case is formed to be a rectangular shape having a predetermined thickness.

Such a battery unit is placed in a housing of a portable computer together with an expansion unit such as a CD-ROM drive. The expansion unit has a thin wall portion decreased in thickness on one side. The thin wall portion adjoins to the battery unit in the housing.

The extended portion of the battery unit is formed by cutting off the end portion of the case adjacent to the battery unit and the thin wall portion of the expansion unit are laid in the direction of the thickness of the housing. For example, Jpn. Pat. Appln. KOKAI Publication No. 2001-143673 discloses an electronic apparatus provided with such a battery unit.

A portable computer has been demanded to be slimmer to increase portability. However, in a conventional portable computer, the thin wall portion of an expansion unit is laid on the extended portion of a battery unit. Thus, in a battery unit having an extended portion, the space in a housing can be effectively used, but the thickness of the housing cannot be decreased.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

A first embodiment of the present invention will be explained hereinafter with reference to FIG. 1 to FIG. 13.

Figure 1:
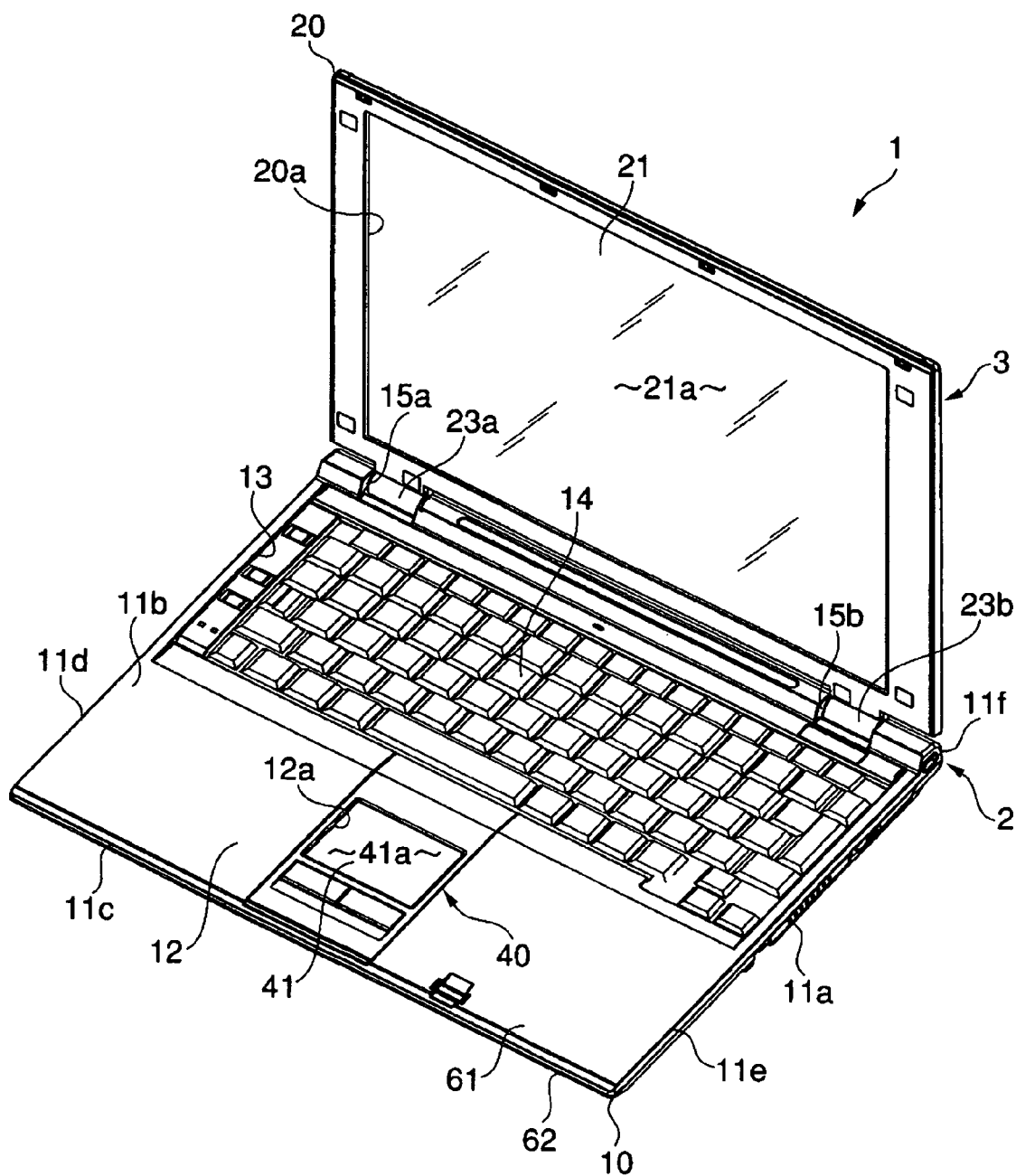
FIG. 1 is an exemplary perspective view of a portable computer according to a first embodiment of the present invention.

FIG. 1 shows a portable computer 1 as an example of an electronic apparatus. The portable computer 1 has a main unit 2 and a display unit 3.

As shown in FIG. 1 to FIG. 4, the main unit 2 has a flat box-shaped first housing 10. The first housing 10 has a bottom wall 11a, an upper wall 11b, a front wall 11c, a left-side wall 11d, a right-side wall 11e and a rear wall 11f. The upper wall 11b has a palm rest 12 and a keyboard mounting part 13. The palm reset 12 is located in the front half of the upper wall 11b, and extended in the direction of the width of the first housing 10. The keyboard mounting part 13 is located behind the palm rest 12. The keyboard mounting part 13 holds a keyboard 14.

The first housing 10 has a pair of display connectors 15a and 15b at the rear end portion. The display connectors 15a and 15b are recesses opened forward, upward and rearward of the first housing 10. The display connectors 15a and 15b are separated each other in the direction of the width of the first housing 10.

The display unit 3 has a second housing 20 and a liquid crystal display panel 21. The liquid crystal display panel 21 is placed in the second housing 20. The liquid crystal display panel 21 has a screen 21a to display an image. The screen 21a is exposed to the outside of the second housing 20 through an opening 20a formed on the front side of the second housing 20.

The second housing 20 has a pair of connector legs 23a and 23b. The connector legs 23a and 23b are separated each other in the direction of the width of the second housing 20, and coupled to the display connectors 15a and 15b of the first housing 10. The connector legs 23a and 23b are held by the display connectors 15a and 15b through hinges (not shown). Thus, the display unit 3 is rotationally movable between the closed position and open position. At the closed position, the display unit 3 lies over the main unit 2 covering the palm rest 12 and keyboard 14. At the open position, the display unit 3 rises against the main unit 2 to expose the palm rest 12, keyboard 14 and screen 21a.

As shown in FIG. 1, FIG. 6, FIG. 7, FIG. 10 and FIG. 11, the first housing 10 contains a pointing device 40 (e.g., a touch pad), a hard disk drive (HDD) 50, and a printed circuit board 52. The first housing 10 holds a battery unit 100 removably.

As shown in FIG. 6 to FIG. 11, the first housing 10 has a top cover 61 and a base 62. According to one embodiment, the top cover 61 and base 62 are made of metallic material such as magnesium alloy, for example. The top cover 61 forms the upper wall 11b, front wall 11c, left and right side walls 11d and 11e, and rear wall 11f of the first housing 10. The base 62 forms the bottom wall 11a of the first housing 10.

The base 62 has a first partition wall 63 and second partition wall 64 raised from the bottom wall 11a. Thus, the inside of the first housing 10 is partitioned into a first receptacle 65, a second receptacle 66 and a third receptacle 67. The first partition wall 63 is located between the first receptacle 65 and second receptacle 66. The second partition wall 64 is located between the first receptacle 65 and third receptacle 67.

Figure 10:
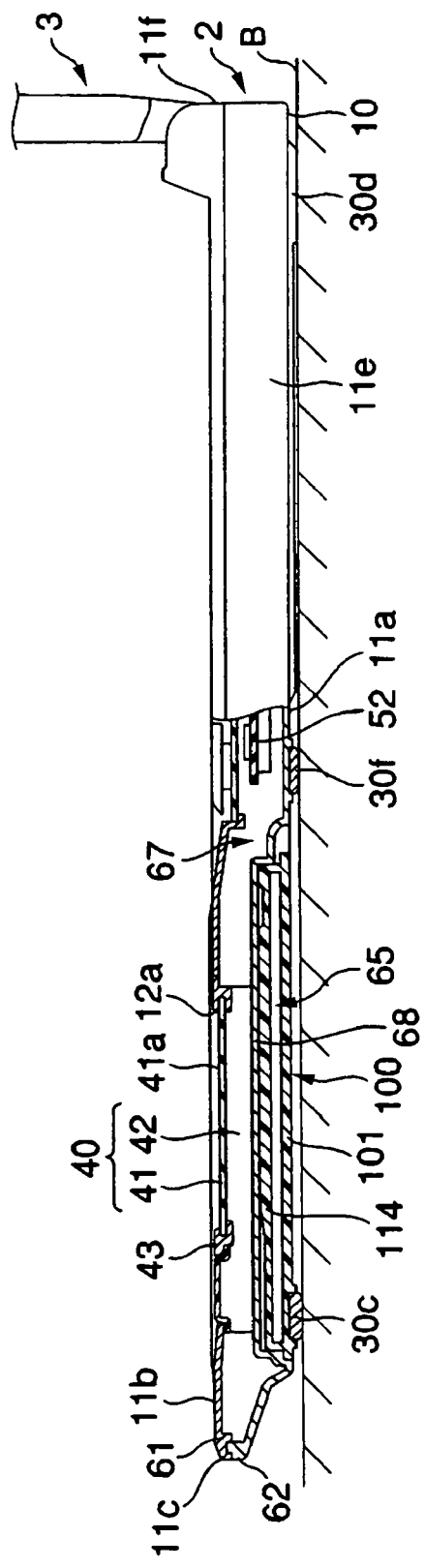
FIG. 10 is an exemplary sectional view taken along lines X-X of FIG. 5.

The base 62 has a pointing device holding part 68 extending in the lateral direction from the rising end portion of the second partition wall 64. The pointing device holding part 68 is an example of a mechanism part. As shown in FIG. 10, the pointing device holding part 68 is located in the first receptacle 65, and recessed downward of the palm rest 12. The pointing device holding part 68 may be formed in the top cover 61.

The first receptacle 65 extends in the direction of the width of the first housing 10 under the palm rest 12. The first receptacle 65 is a recess opened downward of the first housing 10. The second receptacle 66 is located on the right side of the first receptacle 65 under the palm reset 12. The third receptacle 67 is located behind the first and second receptacles 65 and 66. In other words, the third receptacle 67 is located under the keyboard 14.

The pointing device 40 is an example of an electronic component, and located at the center along the direction of the width of the palm rest 12. As shown in FIG. 6, FIG. 7, FIG. 10 and FIG. 11, the pointing device 40 includes an input part 41 and a driving part 42. The upper surface of the input part 41 is a flat input plane 41a. The input part 41 is held by a holding frame 43. The driving part 42 is contained in the first receptacle 65 in the state placed on the pointing device holding part 68.

An opening 12a is provided at the center along the direction of the width of the palm rest 12. The holding frame 43 is located inside the opening 12a. Thus, the input plane 41a of the pointing device 40 is exposed to the outside of the first housing 10 through the opening 12a.

As the input part 41 of the pointing device 40, an electric capacity sensing sheet or a pressure-sensing pressure sensitive film can be used. As the pointing device 40, the input plane 41a of the input part 41 may be laid on the inside surface of the palm rest 12. In this configuration, information is input to the input part 41 through the palm rest 12. Therefore, the opening 12a can be eliminated from the palm rest 12.

According to this embodiment of the portable computer 1, the pointing device 40 is placed at the center along the direction of the width of the palm rest 12. If the pointing device 40 should be displaced from the center along the direction of the width of the palm rest 12, the pointing device 40 may be difficult to use and obstructive to the operation of the keyboard 14.

Figure 6:
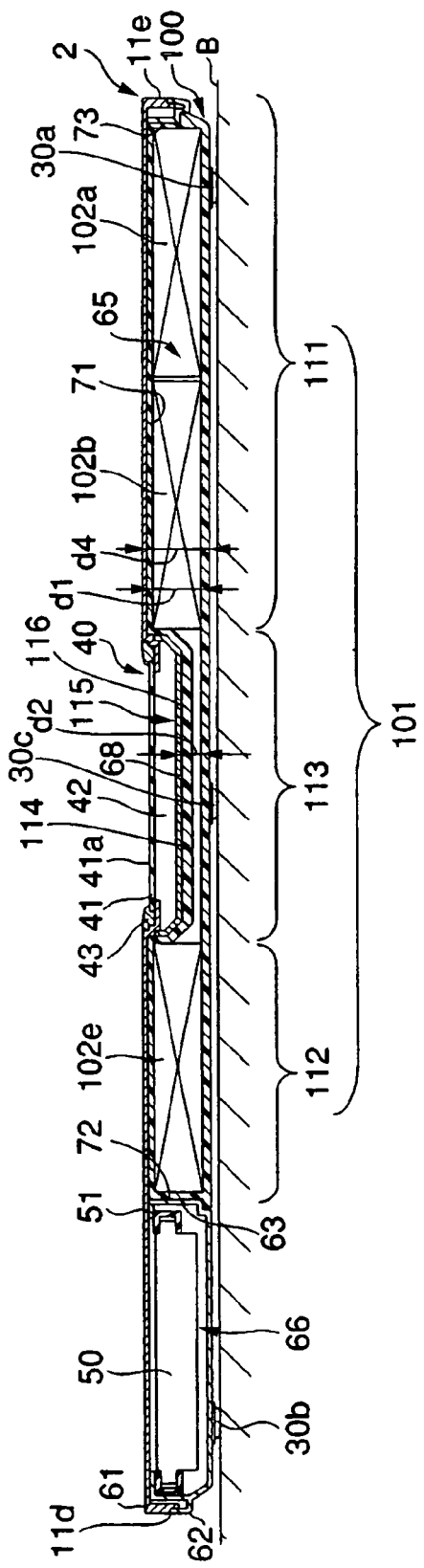
FIG. 6 is an exemplary sectional view taken along lines VI-VI of FIG. 5.
Figure 7:
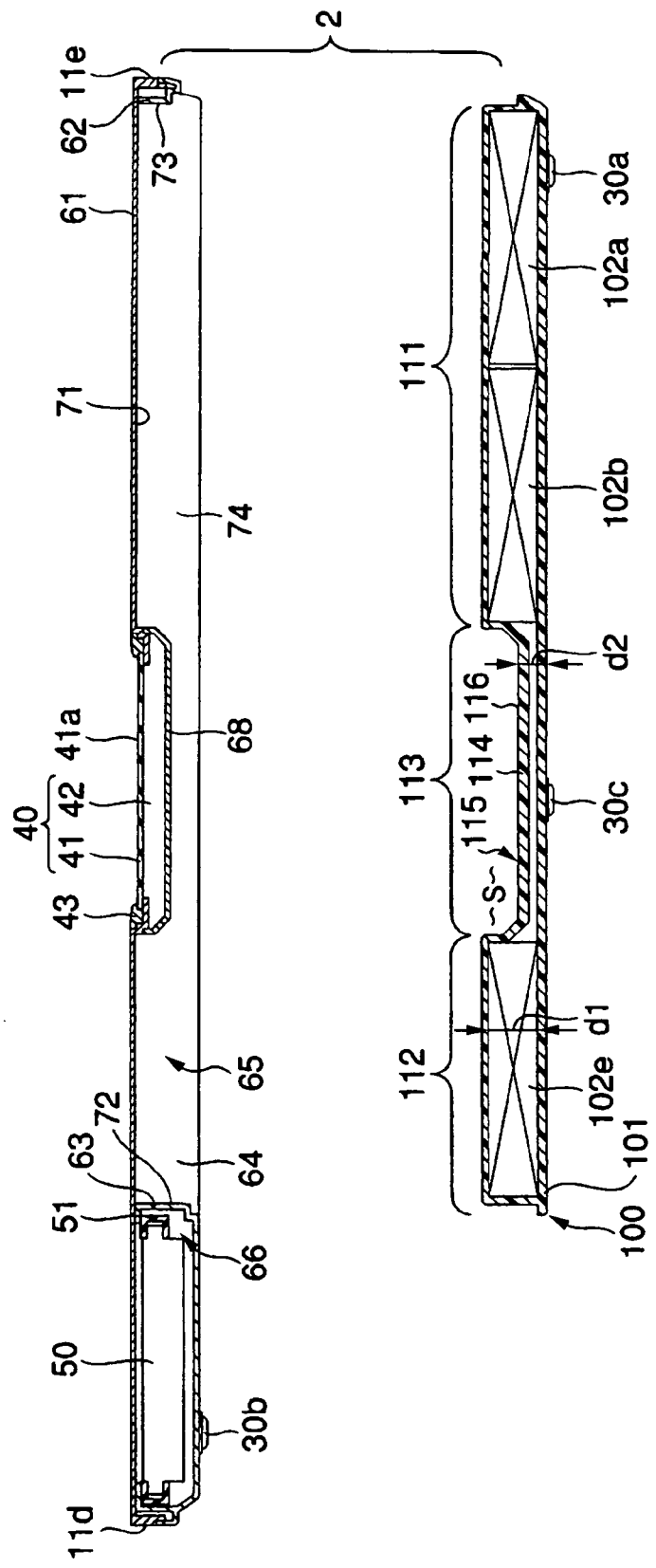
FIG. 7 is an exemplary sectional view of a portable computer with the battery unit removed from the first housing in the first embodiment of the present invention.

As shown in FIG. 6 and FIG. 7, the HDD 50 is placed in the second receptacle 66 through a holding member 51. The holding member 51 is fixed to the first housing 10 through a screw. The HDD 50 is located under the palm rest 12, and placed at the corner defined by the front wall 11c and left side wall 11d of the first housing 10.

Figure 4:
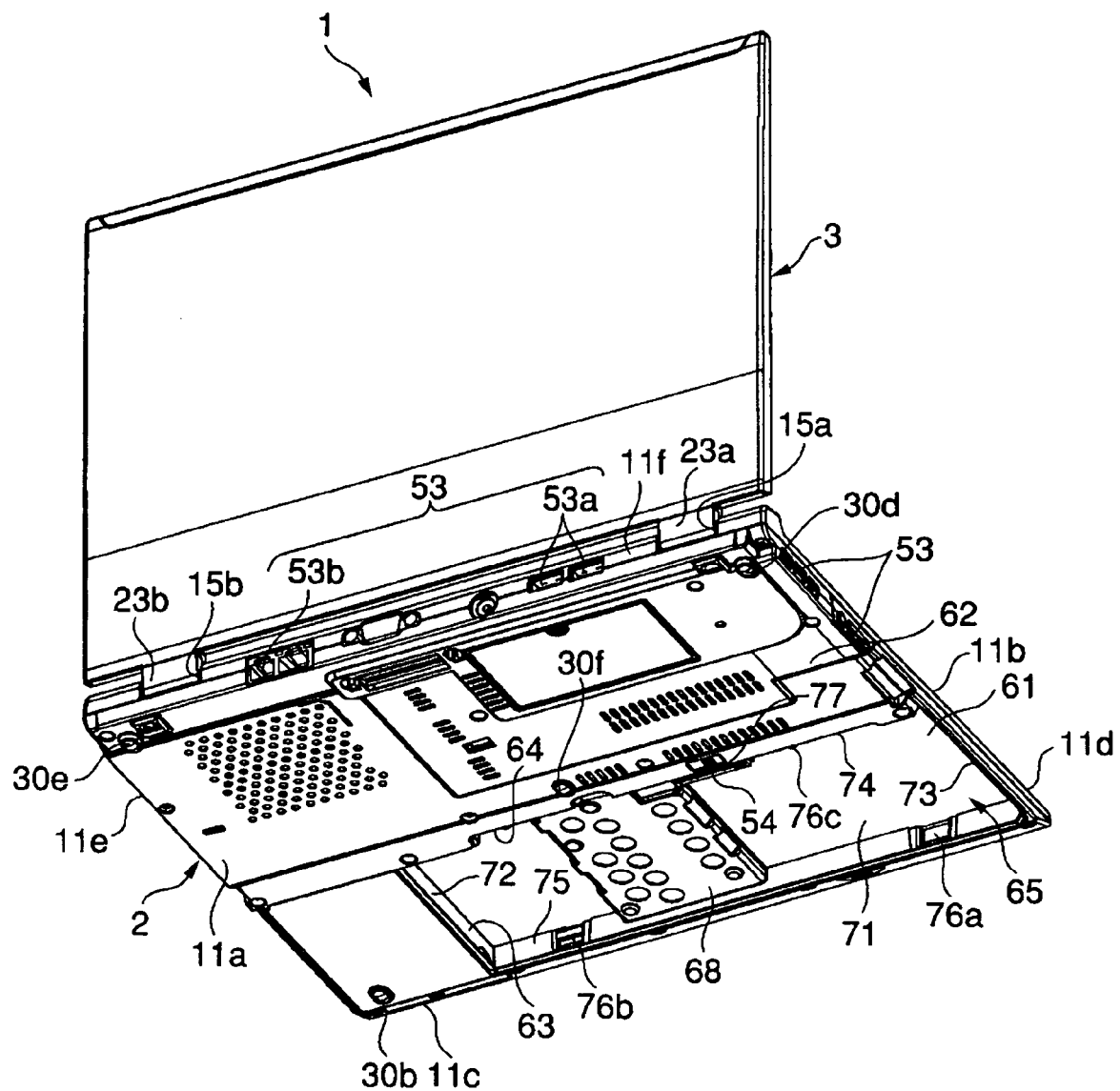
FIG. 4 is an exemplary perspective view of a portable computer with the battery unit removed from the first housing in the first embodiment of the present invention.
Figure 11:
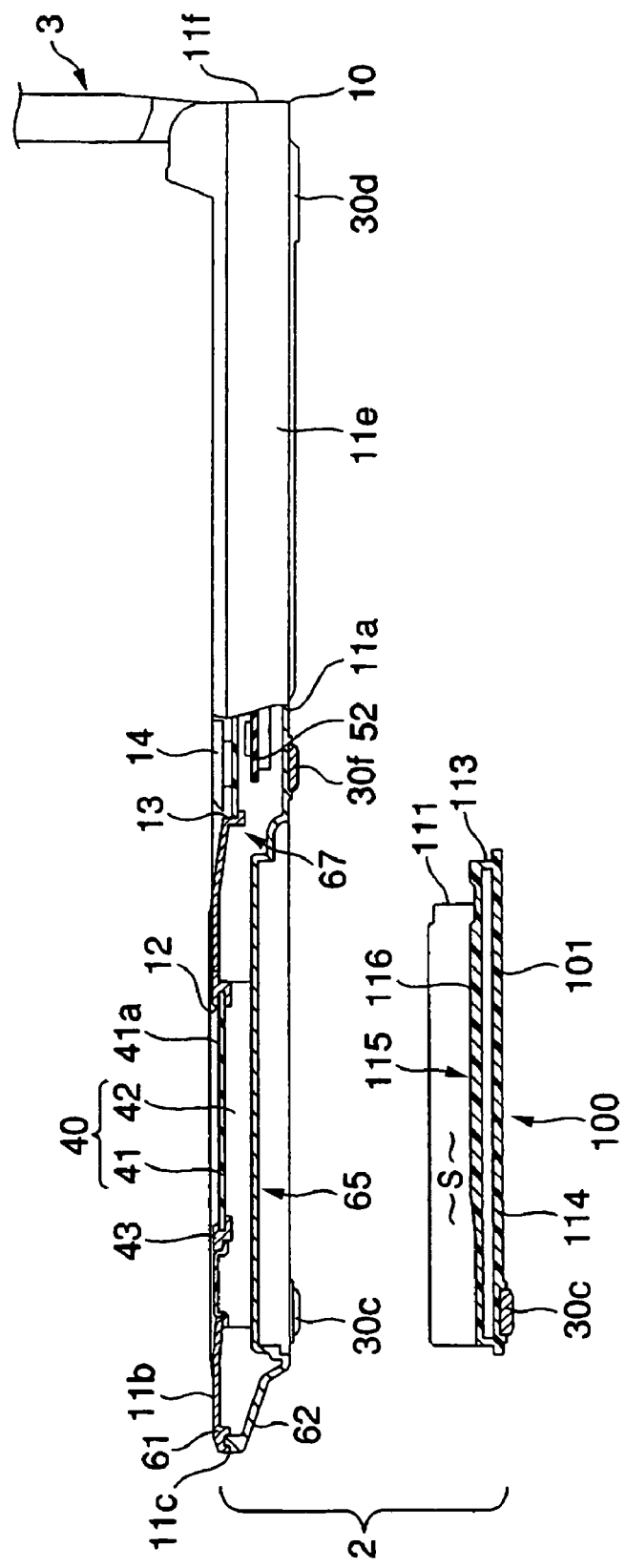
FIG. 11 is an exemplary sectional view of a portable computer with the battery unit removed from the first housing in the first embodiment of the present invention.

As shown in FIG. 10 and FIG. 11, the printed circuit board 52 is placed in the third receptacle 67 to be located under the keyboard 14. The printed circuit board 52 is fixed to the first housing 10 through screws. The printed circuit board 52 has an extended portion (not shown) extending to the first part 111. A power supply connector 54 is provided in the extended portion. As shown in FIG. 4, the power supply connector 54 is exposed to the first receptacle 65.

When the first housing 10 has a PC card slot, the PC card slot may be provided in the second receptacle 66 and the HDD 50 may be placed in the third receptacle 67.

Figure 2:
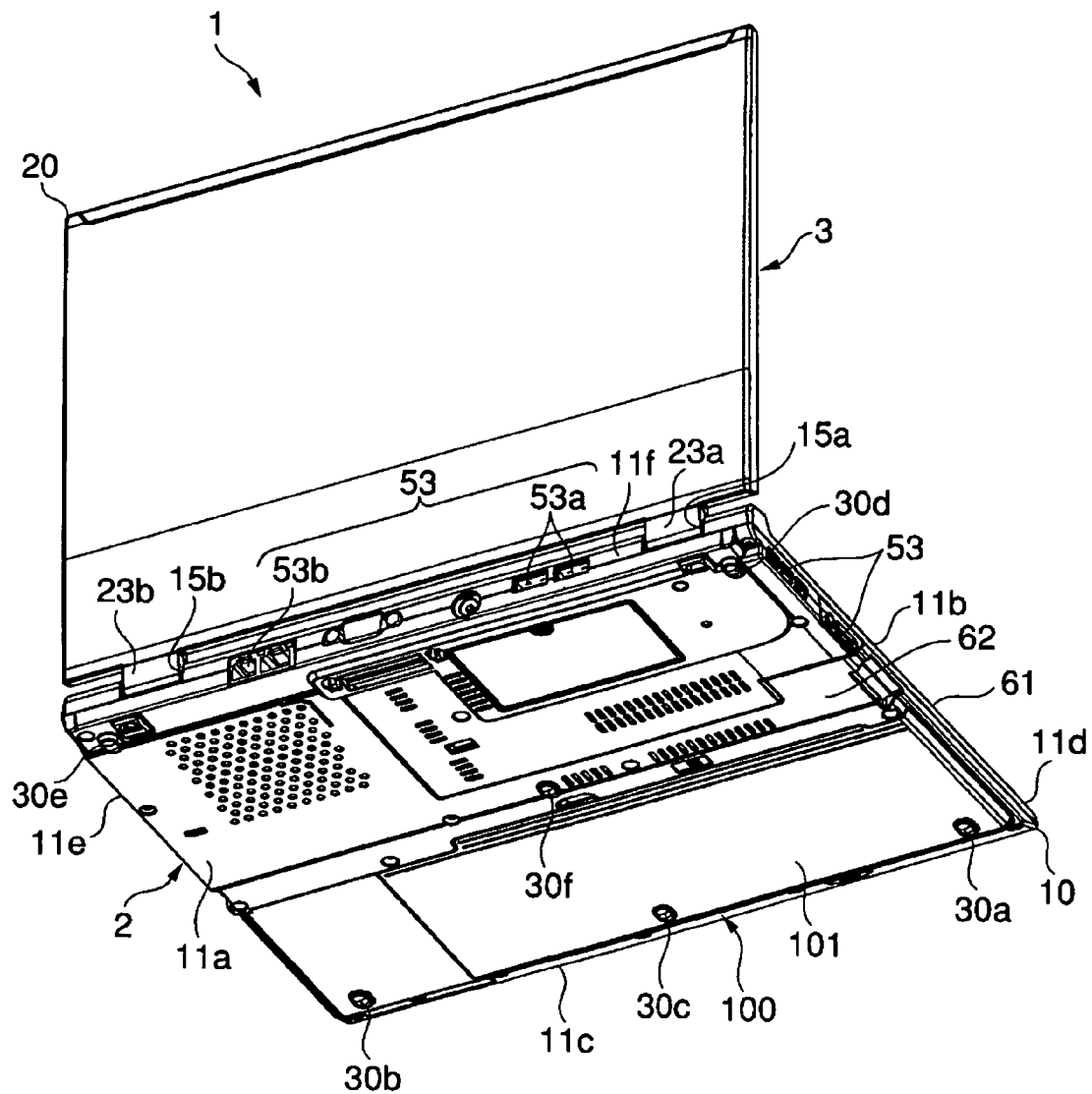
FIG. 2 is an exemplary perspective view of a portable computer with a battery unit placed in a first housing in the first embodiment of the present invention.
Figure 3:
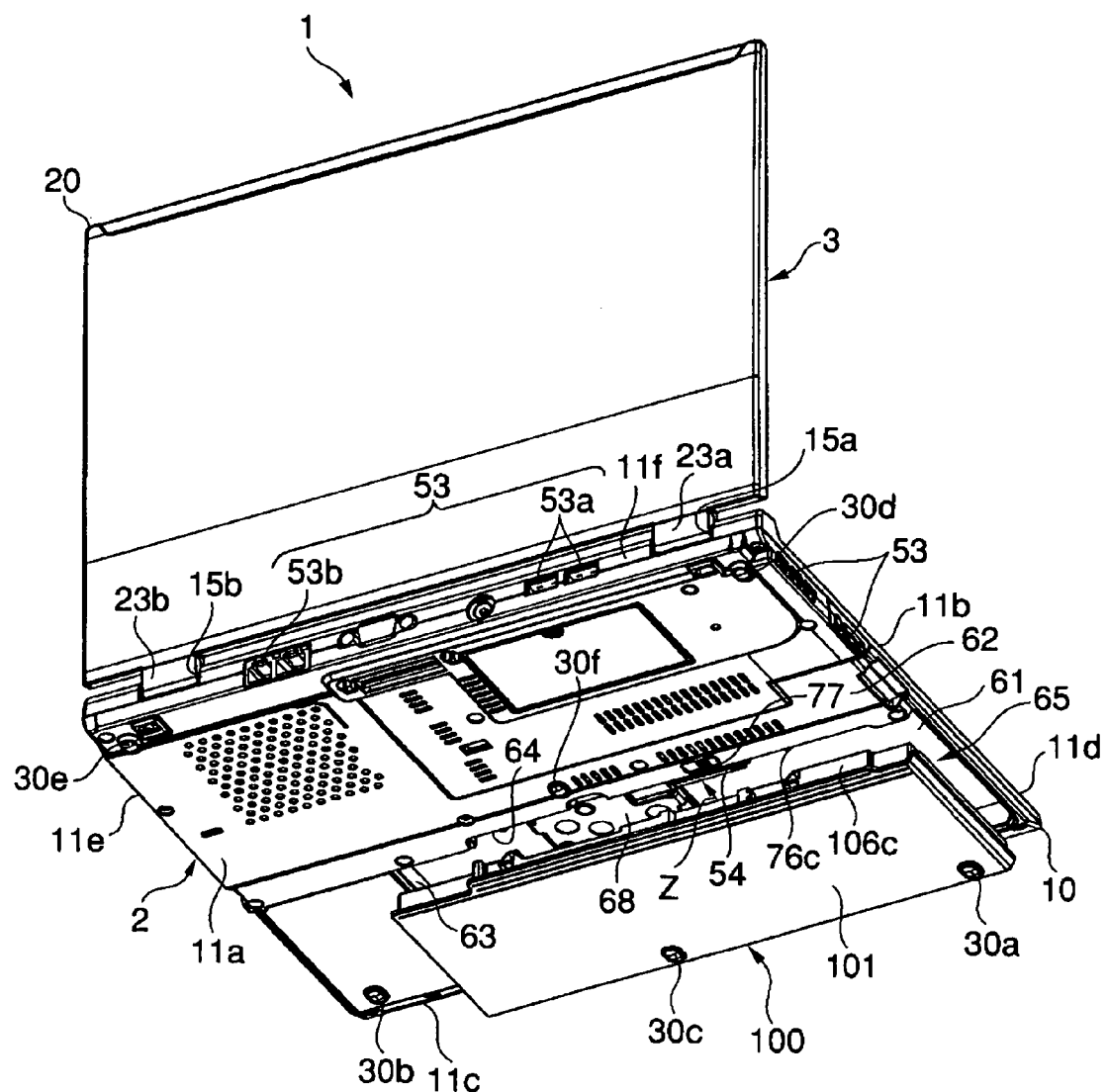
FIG. 3 is an exemplary perspective view of a portable computer showing the positional relationship between the first housing and battery unit in the first embodiment of the present invention.

A connector panel (not shown) is placed in the third receptacle 67 of the first housing 10. The connector panel holds connectors 53 such as Universal Serial Bus (USB) connectors 53a and network (LAN) connectors 53b. The connectors 53 are electrically connected to the printed circuit board 52. As shown in FIG. 2 and FIG. 3, the connectors 53 are exposed to the outside of the first housing 10 through the rear wall 11f and right-side wall 11d.

As shown in FIG. 2 and FIG. 3, the battery unit 100 is placed removably in the first receptacle 65 under the palm rest 12. The battery unit 100 serves as a driving power source, when the portable computer 1 is used in a place where utility power is not obtained. The battery unit 100 is adjacent to the HDD 50, and exposed from the first receptacle 65 toward the bottom wall 11a of the first housing 10.

The pointing device 40 is provided at the center along the direction of the width of the palm rest 12. Thus, a part of the battery unit 100 faces the pointing device holding part 68. Therefore, the pointing device 40, pointing device holding part 68 and battery unit 100 are layered in the direction of the thickness of the first housing 10. The battery unit 100 of this embodiment has an escape section 115 to avoid the pointing device 40 and the pointing device holding part 68.

Figure 9:
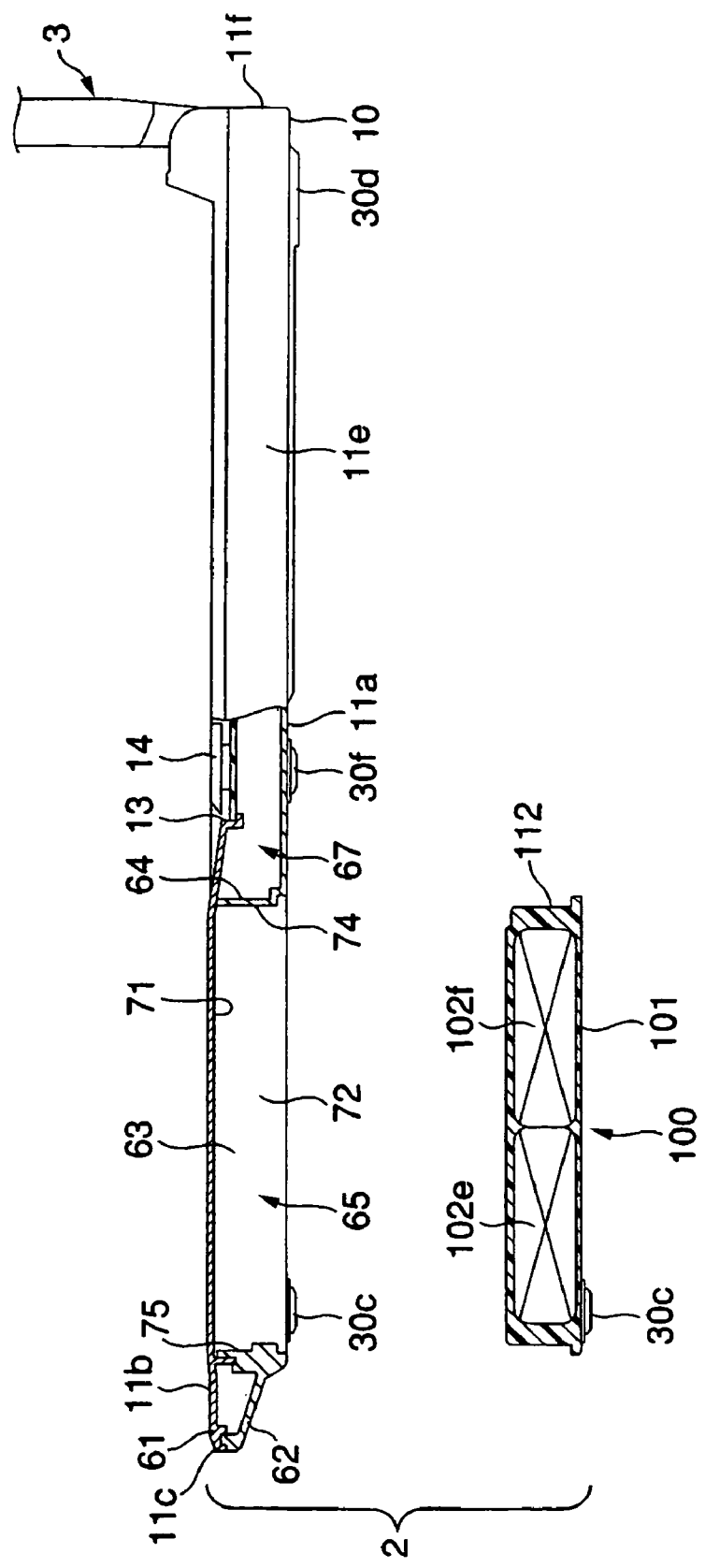
FIG. 9 is an exemplary sectional view of a portable computer with the battery unit removed from the first housing in the first embodiment of the present invention.

Describing in detail, as shown in FIG. 4, FIG. 7 and FIG. 9, the first receptacle 65 has a ceiling 71, first and second end faces 72 and 73, and first and second sides 74 and 75. The ceiling 71 is defined by the inside surface of the palm rest 12 and the lower surface of the pointing device holding part 68. The part of the ceiling 71 corresponding to the pointing device holding part 68 extends downward from the inside surface of the top cover 61.

The first and second end faces 72 and 73 and the first and second sides 74 and 75 extend downward from the ceiling 71. The first end face 72 is formed in the first partition wall 63. The second end face 73 is formed in the left-side wall 11d. The first end face 72 and second end face 73 are opposed in the direction of the width of the first housing 10.

The first side 74 is formed in the second partition wall 64. The second side 75 is formed in the base 62. The first side 74 and second side 75 are opposed in the direction of the depth of the first housing 10.

As shown in FIG. 6, FIG. 7, FIG. 12 and FIG. 13, the battery unit 100 has a case 101 made of synthetic resin, cells 102a-102f as secondary batteries, and a substrate 103. The cells 102a-102f may be square cells having a flat box-shaped outward form. The cells 102a-102f may also be round cells having a cylindrical outward form.

Figure 12:
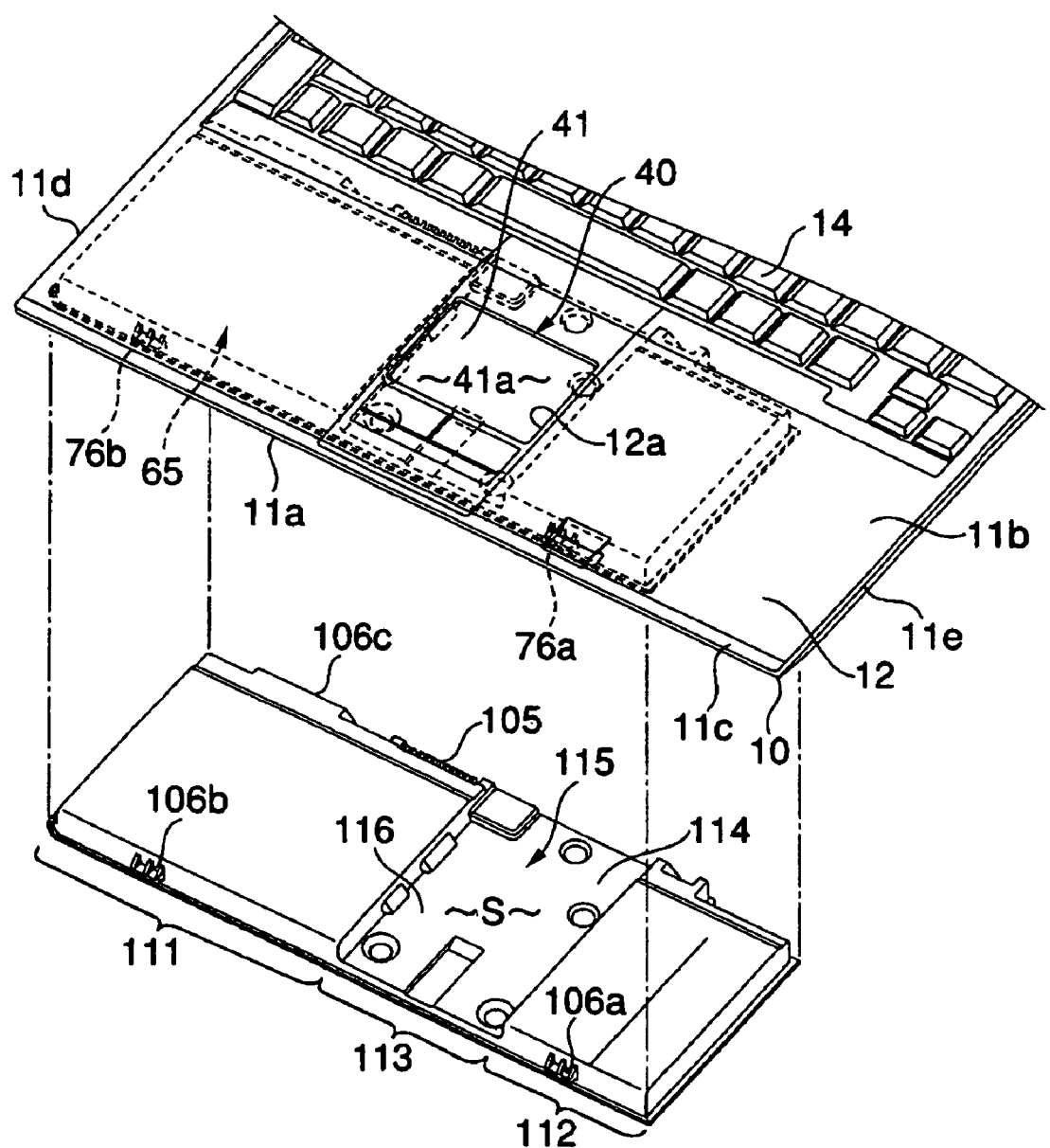
FIG. 12 is an exemplary perspective view of a portable computer showing the positional relationship between the palm rest of the first housing and the battery unit in the first embodiment of the present invention.
Figure 13:
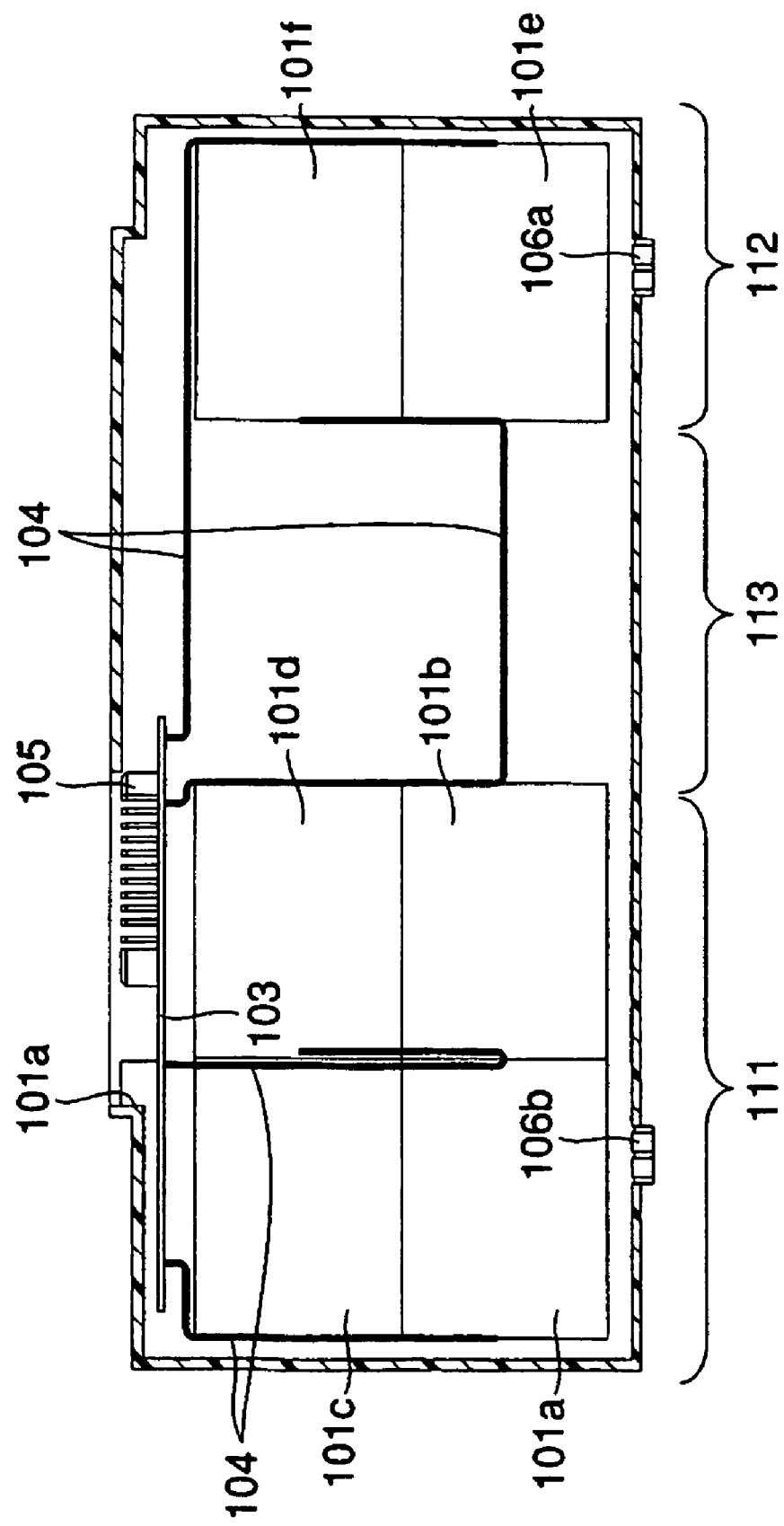
FIG. 13 is an exemplary sectional view of a battery unit according to the first embodiment of the present invention.

As shown in FIG. 7, FIG. 12 and FIG. 13, the case 101 has first to third parts 111, 112 and 113. The first part 111 contains four cells 102a-104d. The second part 112 contains two cells 102e and 102f. The third part 113 is located between the first part 111 and second part 112, and connects the first part 111 and second part 112.

The positive polarities and negative polarities of the four cells 102a-102d contained in the first receptacle are electrically connected to the substrate 103 through a wiring board 104. The positive polarities and negative polarities of the two cells 102e and 102f contained in the second receptacle 66 are electrically connected to the substrate 103 through the wiring board 104. Therefore, in this embodiment, the cells 102a, 102b and 102e are aligned and connected in series in the case 101. Likewise, the cells 102c, 102d and 102f are aligned and connected in series in the case 101. Further, the cells 102a and 102c, 102b and 102d, and 102e and 102f are connected in parallel.

Therefore, the first part 111 and second part 112 to contain the cells 102a-102f are divided while holding the electrical connection of the cells 102a-102f.

The cells 102a-102f have electrical resistance components. Thus, the electrical balance of the whole battery unit 100 can be adjusted by changing the resistance of the wiring board 104 which electrically connects the cells 102a-102f.

The third part 113 of the case 101 has the escape section 115. In the battery unit 100 of this embodiment, the escape section 115 is made thinner than the first and second parts 111 and 112.

In other words, the escape section 115 has a recess 116 opened to the upper side of the case 101. The recess 116 is opposite to the pointing device holding part 68. Due to the recess 116, the third part 113 of the case 101 has a thin wall portion 114. As shown in FIG. 7, the thickness d2 of the thin wall portion 114 is smaller than the thickness d1 of the cells 102a-102f. As shown in FIG. 6, the thickness d2 of the thin wall portion 114 is smaller than the thickness d4 of the first and second parts 111 and 112.

In the battery unit 100 of this embodiment, the lower surface of the case 101 opposite to the escape section 115 is a flat square plane.

As shown in FIG. 13, the substrate 103 of the battery unit 100 is placed in the first part 111 of the case 101. The substrate 103 stands in the case 101 along the direction of the thickness of the case 101. A connector 105 is provided on the substrate 103. The connector 105 is exposed to the outside of the case 101 from an opening 101a formed in the case 101. The connector 105 is connected to the power supply connector 54, when the battery unit 100 is placed in the first receptacle 65.

The substrate 103 and connector 105 are not necessarily provided at the position corresponding to the first part 111 of the case 101. For example, the substrate 103 may be provided in the second part 112 or third part 113 and adapted for coupling with connector 105. In other words, the substrate 103 and connector 105 may be provided in different parts of the case 101.

As shown in FIG. 3, an engagement part 106c is provided on the rear surface of the case 101. As shown in FIG. 12, a pair of other engagement parts 106a and 106b is provided on the front surface of the case 101. The engagement parts 106a and 106b are separated in the longitudinal direction of the case 101.

A first receiving part 76c shown in FIG. 3 is provided in the first side 74 of the first receptacle 65. The first receiving part 76c engages with the engagement part 106c of the case 101, when the battery unit 100 is placed in the first receptacle 65. The first receiving part 76c is slid in the direction of the width of the first housing 10 by a release lever 77. The release lever 77 is exposed to the bottom wall 11a of the first housing 10.

As shown in FIG. 4 and FIG. 12, a pair of second engagement parts 76a and 76b is provided on the second side 75 of the first receptacle 65. The second engagement parts 76a and 76b engage with the engagement parts 106a and 106b, when the battery unit 100 is placed in the first receptacle 65.

As indicated by the arrow Z in FIG. 3, the battery unit 100 is inserted into the first receptacle 65 with the connector 105 of FIG. 12 faced to the power supply connector 54. The case 101 of the battery unit 100 is pushed into the first receptacle 65, so that the upper surface of the case 101 comes close to the ceiling 71 of the first receptacle 65. As a result, the engagement part 106c engages with the first receiving part 76c, and the other engagement parts 106a and 106b engage with the second receiving parts 76a and 76b. By this engagement, the battery unit 100 is held in the first housing 10, and the escape section 115 of the case 101 is laid over the pointing device 40 and the pointing device holding part 68. At the same time, the connector 105 of the battery unit 100 is electrically connected to the power supply connector 54.

In the state that the battery unit 100 is placed in the first receptacle 65, the lower surface of the case 101 is placed on substantially the same level as the outside surface of the bottom wall 11a of the first housing 10. Thus, the lower surface of the case 101 functions as a part of the bottom wall 11a of the first housing 10.

By placing the battery unit 100 in the first receptacle 65 of the first housing 10, the pointing device 40 and the pointing device holding part 68 are fitted into the escape section 115 of the case 101. In other words, the battery unit 100 is placed in the first housing 10 with the escape section 115 laid on the pointing device 40 and the pointing device holding part 68 in the direction of the thickness of the first housing 10.

When removing the battery unit 100 from the first housing 10, slide the release lever 77. By this sliding operation, the first receiving part 76c is separated and disengaged from the engagement part 106c of the battery unit 100. As a result, the rear end portion of the battery unit 100 is lifted from the first housing 10. Therefore, the battery unit 100 can be removed from the first housing 10 by hooking a finger on the rear end portion of the battery unit 100 and taking out the battery unit 100 from the first receptacle 65.

In the above configuration, the battery unit 100 is exposed from the first receptacle 65 to the outside of the first housing 10, and the lower surface of the case 101 is placed on substantially the same level as the outside surface of the bottom wall 11a of the first housing 10. Therefore, the first housing 10 can be slimmed by the extent equivalent to the thickness of the bottom wall 11a, compared with the case of placing the battery unit 100 in the area between the bottom wall 11a and upper wall 11b of the first housing 10.

In the state that the battery unit 100 is placed in the first receptacle 65, the pointing device 40 and the pointing device holding part 68 are fitted into the escape section 115 of the battery unit 100. Therefore, the first housing 10 can be slimmed by the extent equivalent to the thickness of the pointing device 40.

Besides, in the battery unit 100 of this embodiment, the cells 102*a*, 102*b* and 102*e* are connected in series with the cells 102*c*, 102*d* and 102*f*. The cells 102*a* and 102*c*, 102*b* and 102*d*, and 102*e* and 102*f* are connected in parallel. Therefore, though the escape section 115 is formed in the case 101, sufficient electric capacity of the battery unit 100 can be secured as in a conventional battery unit.

Figure 8:
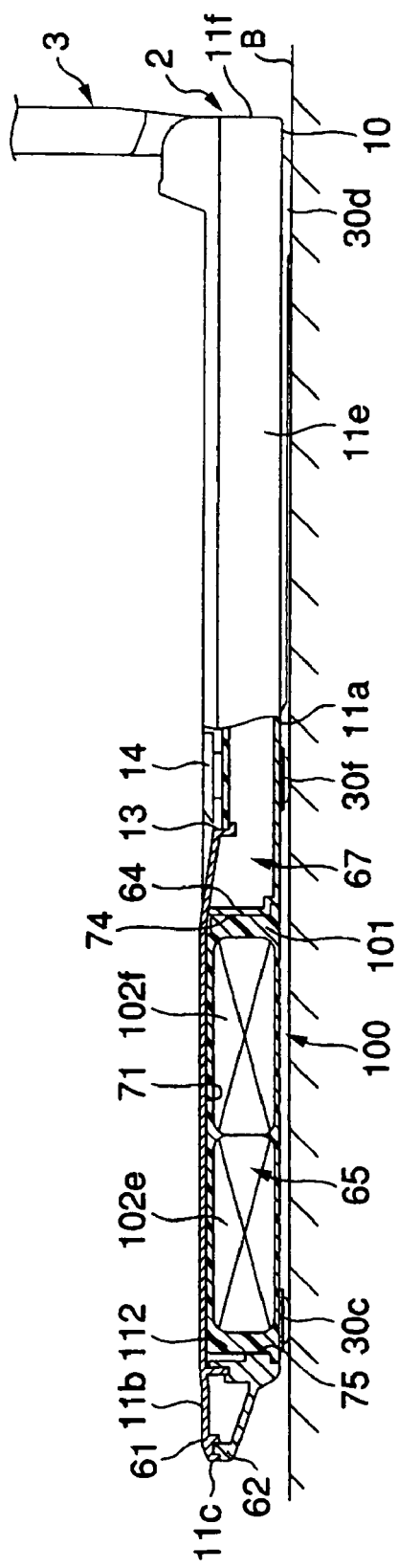
FIG. 8 is an exemplary sectional view taken along lines VIII-VIII of FIG. 5.

As shown in FIG. 6 and FIG. 8, the upper side of the case 101 of the battery unit 100 is hidden by the first housing 10, when the portable computer 1 is placed on the top plane B of a desk, for example. Therefore, in the ordinary operating state, the battery unit 100 is not exposed to the outside of the portable computer 1.

Further, in the state that the battery unit 100 is placed in the first receptacle 65, the lower surface of the case 101 of the battery unit 100 is placed on substantially the same level as the outside surface of the bottom wall 11*a* of the first housing 10. Therefore, as shown in FIG. 2 and FIG. 3, by providing feet 30*a*-30*f* on the lower surface of the case 101 and the outside surface of the bottom wall 11*a* of the first housing 10, the portable computer 1 can be stably set on the top plane B.

Figure 5:
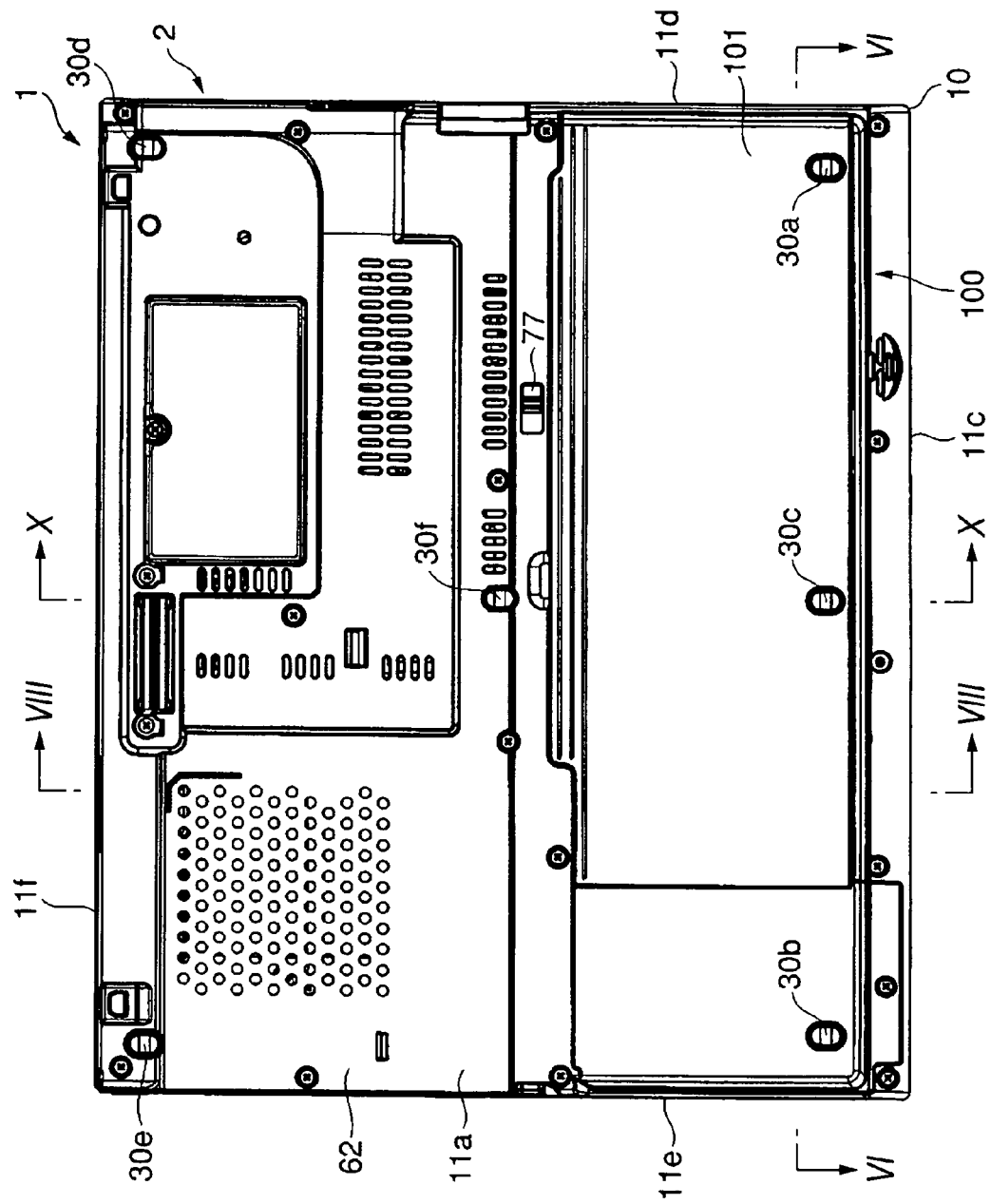
FIG. 5 is an exemplary plane view of a portable computer showing the positional relationship between the first housing and battery unit in the first embodiment of the present invention.

Namely, as shown in FIG. 2 and FIG. 5, the two feet 30*a* and 30*c* are provided on the lower surface of the case 101. The four feet 30*b*-30*f* are provided on the outside surface of the bottom wall 11*a* of the first housing 10. The feet 30*a*, 30*b* and 30*c* are located at the front end portion of the first housing 10, and aligned with intervals in the direction of the width of the first housing 10. The feet 30*d* and 30*e* are located at the rear end portion of the first housing 10, and separated each other in the direction of the width of the first housing 10. The foot 30*f* is located at the center of the bottom wall 10*a*.

Therefore, in the state that the portable computer 1 is set on the top plane B of a desk, as shown in FIG. 8 and FIG. 10, the feet 30*a*-30*f* contacts the upper surface of the top plane B. Particularly, in this embodiment, three feet 30*a*-30*c* are aligned at intervals proximate to the front end portion of the first housing 10. Therefore, when operating the pointing device 40 located at the center of the palm rest 12, the portable computer 1 does not tilt and wobble on the top plane B.

The battery unit 100, according to this embodiment, comprises a case 101, and cells 102*a*-102*f*. The case 101 has a first part 111 to contain four cells 102*a*-102*d*, a second part 112 to contain two cells 102*e* and 102*f*, and a third part 113 to connect the first and second parts 111 and 112. The third part has an escape section 115.

Therefore, when placing the battery unit 100 in the first receptacle 65, at least a part of the pointing device 40 and the pointing device holding part 68 is led to (e.g., situated within) the space S defined by the escape section 115, and the portable computer 1 can be made slimmer.

In other words, the third part 113 of the case 101 has a thin wall portion 114. The thickness d2 of the thin wall portion 114 is smaller than the thickness d4 of the first and second parts 111 and 112. Therefore, when placing the battery unit 100 in the first receptacle 65, at least a part of the pointing device 40 and the pointing device holding part 68 is laid on the thin wall portion 114 of the case 101 along the direction of the thickness of the first housing 10, and the portable computer 1 can be slimmed.

Further, the third part 113 has a recess 116. Therefore, at least a part of the pointing device 40 and the pointing device holding part 68 is laid on the recess 116, and the portable computer 1 can be made slimmer.

As described above, according to this embodiment, there is provided a battery unit 100, which contributes to slimming of an electronic apparatus such as a portable computer 1.

The battery unit 100 of this embodiment electrically connects four cells 102*a*-102*d* contained in the first part 111 to two cells 102*e* and 102*f* contained in the second part 112. Therefore, as in an ordinary battery unit, the battery unit 100 can provides power proportional to the total volume of the cells 102*a*-102*f*.

Further, according to the battery unit 100 of this embodiment, the first part 111 to contain cells 102*a*-102*d* is electrically connected to but separated from the second part 112 to contain cells 102*e* and 102*f*. Therefore, the battery unit 100 may have one connector 105 and one power supply connector 54.

In the portable computer 1 of this embodiment, the battery unit 100 that is a heavy component is placed at the front end portion of the first housing 10. Therefore, when moving the display unit 3 between the closed position and open position, the front end portion of the main unit 2 is prevented from lifting. Therefore, the main unit 2 is stabilized, and the display unit 3 can be easily moved.

The printed circuit board 52 connected electrically to the battery unit 100 through the connector 105 and power supply connector 54 is located immediately after the battery unit 100 in the first housing 10. A CPU (not shown) mounted on the printed circuit board 52 tends to generate heat during operation as the processing speed and functions are increased. Comparing with such a CPU, the battery unit 100 is heated a little. Therefore, even if the battery unit 100 is placed under the palm rest 12, the operator can operate the keyboard 14 without any adverse influences from heat experienced at the battery unit 100.

In the above embodiment, when the battery unit 100 is placed in the first receptacle 65, the bottom of the recess 116 of the case 101 may contact the pointing device holding part 68. However, the present invention is not limited to this particular architecture. There may be a gap between the bottom of the recess 116 and the pointing device holding part 68.

The shape, number and location of the escape section 115 are optional feature, and not limited to the above embodiment.

Figure 14:
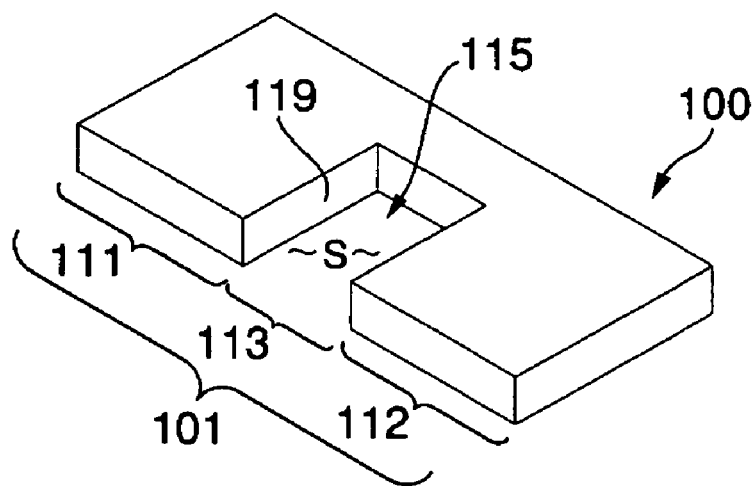
FIG. 14 is an exemplary perspective view of a battery unit according to a second embodiment of the present invention.

FIG. 14 shows a second exemplary embodiment of the present invention. In the second embodiment, the shape of a battery unit 100 is different from the first embodiment. However, various components and features are the same as the first embodiment. Therefore, for the second embodiment of the battery unit 100, the same reference numerals are given to the same components as the first embodiment, and explanation will be omitted.

In the battery unit 100 of this embodiment, the third part 113 of a case 101 has an escape section 115. The escape section 115 is defined by a notch 119 cut out in the direction of the thickness of the case 101. At least a part of an electronic component or mechanical component is led to the space S defined by the notch 119, and an electronic apparatus such as a portable computer 1 can be made slimmer.

The shape, number and location of the notch 119 are optional. In other words, the shape, number and location are desirably determined by the position of an electronic component or mechanical component.

Figure 15:
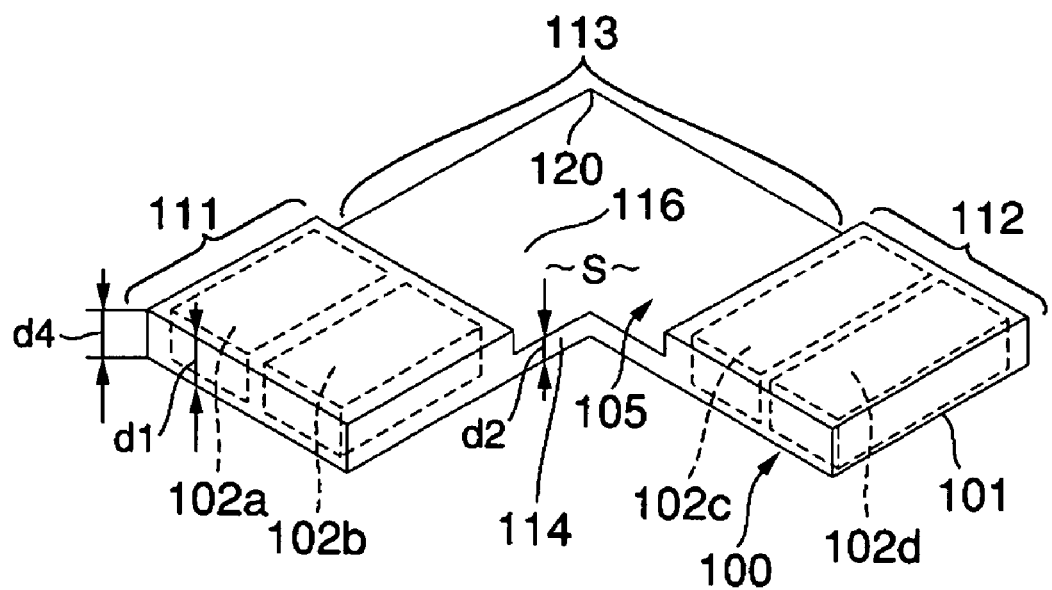
FIG. 15 is an exemplary perspective view of a battery unit according to a third embodiment of the present invention.

FIG. 15 shows a third exemplary embodiment of the present invention. In the third embodiment, the shape of a battery unit 100 is different from the first embodiment. However, various components and features are the same as the first embodiment. Therefore, for the third embodiment of the battery unit 100, the same reference numerals are given to the same components as the first embodiment, and explanation will be omitted.

According to this embodiment, a case 101 of the battery unit 100 has a first part 111 to contain a pair of cells 102a and 102b, a second part 112 to contain a pair of cells 102c and 102d, and a third part 113 to connect the first and second parts 111 and 112. The first part 111 and second part 112 are arranged in the direction orthogonal to each other. The third part 113 has a corner 120 ("a section"). In this embodiment, the corner 120 is formed substantially at a right angle. The angle of the corner 120 is optionally determined by the positional relationship between the first part 111 and second part 112.

The third part 113 has an escape section 115. The escape section 115 is made thinner than the first and second parts 111 and 112. In other words, the escape section 115 is defined by a recess 116 having an upward opening. Due to the recess 116, the third part 113 of the case 101 has a thin wall portion 114. The thickness d2 of the thin wall portion 114 is smaller than the thickness d1 of the cells 102a-102d. Also, the thickness d2 of the thin wall portion 114 is less than the thickness d4 of the first and second parts 111 and 112.

According to this embodiment, since the third part 113 of the battery unit 100 includes the recess 116, at least a part of an electronic component or mechanical component is led to the space S defined by the recess 116, and an electronic apparatus such as a portable computer 1 can be made slimmer.

Figure 16:
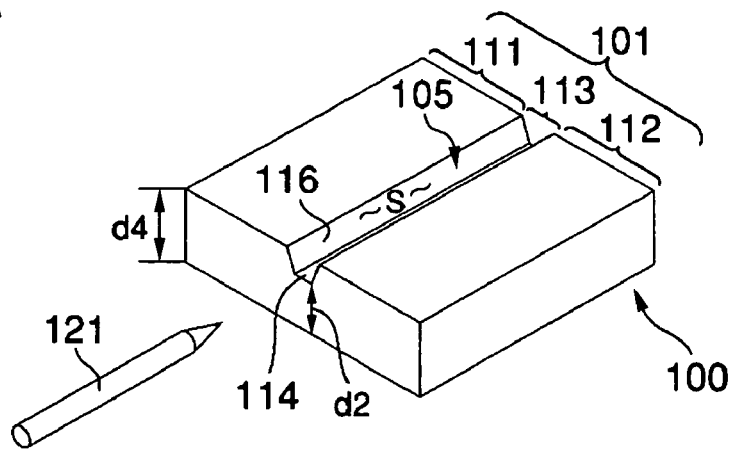
FIG. 16 is an exemplary perspective view of a battery unit according to a fourth embodiment of the present invention.

FIG. 16 shows a fourth exemplary embodiment of the present invention. In the fourth embodiment, the shape of a battery unit 100 is different from the first embodiment, but includes various components that are the same as the first embodiment. Hence, discussions of these similar components have been omitted.

According to this embodiment, a third part 113 of the battery unit 100 has an escape section 115. The escape section 115 is defined by a groove-like recess 116. Due to the recess 116, the third part 113 has a thin wall portion 114. The thickness d2 of the thin wall portion 114 is smaller than the thickness d4 of first and second parts 111 and 112.

According to this embodiment, the third part 113 of the battery unit 100 has a groove-like recess 116. Therefore, at least a part of an electronic component or mechanical component is led to the space S defined by the recess 116, and an electronic apparatus such as a portable computer 1 can be made slimmer.

Further, according to this embodiment, since the recess 116 is shaped like a groove, it is convenient to insert a stylus 121, which inputs information to the pointing device 40, for example. Therefore, the stylus 121 can be removably provided in the periphery of the battery unit 100.

The stylus 121 is available in two types. One inputs information in the pointing device 40 by using electrostatic induction, and the other inputs information by applying pressure on the pointing device 40. The stylus 121 using electrostatic induction is an example of electronic component. The pressure-type stylus 121 is an example of mechanical component.

Figure 17:
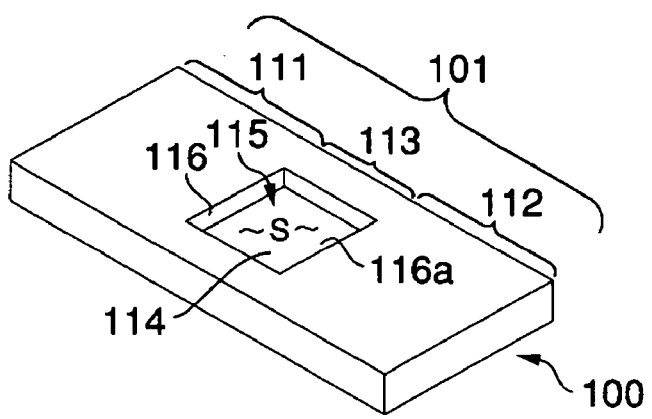
FIG. 17 is an exemplary perspective view of a battery unit according to a fifth embodiment of the present invention.

FIG. 17 shows a fifth exemplary embodiment of the present invention. According to the fifth embodiment, the shape of a battery unit 100 is different from the first embodiment. However, there exist a number of components that are the same as the first embodiment. Hence, discussions of these similar components have been omitted.

According to this embodiment, a third part 113 of a case 101 of the battery unit 100 is placed on the same plane as first and second parts 111 and 112. The third part 113 has an escape section 115. The escape section 115 is defined by a substantially square recess 116 having a bottom 116a. Due to the recess 116, the third part 113 of the case 101 has a thin wall portion 114 with the thickness smaller than the first and second parts 111 and 112.

According to this embodiment, at least a part of an electronic component or mechanical component is led to the space S defined by the recess 116 and layered on the bottom 116a, and an electronic apparatus such as a portable computer 1 can be made slimmer.

Figure 18:
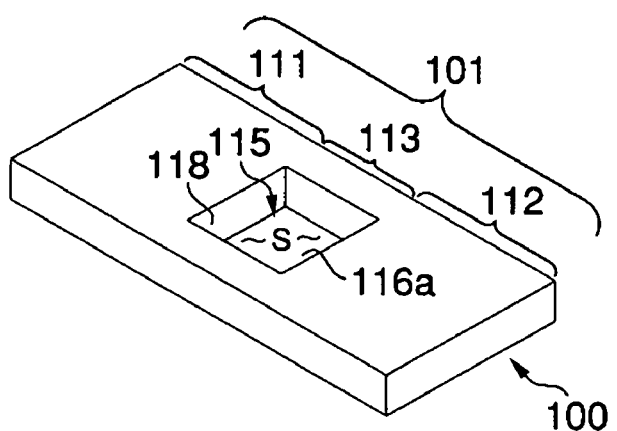
FIG. 18 is an exemplary perspective view of a battery unit according to a sixth embodiment of the present invention.

FIG. 18 shows a sixth exemplary embodiment of the present invention. According to the sixth embodiment, the shape of an escape section 115 of a case 101 is different from the fifth embodiment. However, there exist a number of components that are the same as the fifth embodiment. Hence, discussions of these similar components have been omitted.

According to this embodiment, the escape section 115 of the case 101 is defined by a square hole 118. The hole 118 is a through hole formed at the center of the third part 113.

According to this embodiment, at least a part of an electronic component or mechanical component is led to the space S defined by the hole 118, and an electronic apparatus such as a portable computer 1 can be made slimmer. The shape, number and location of the hole 118 are optional. In other words, the shape, number and location are desirably determined by the position of electronic component or mechanical component.

Figure 19:
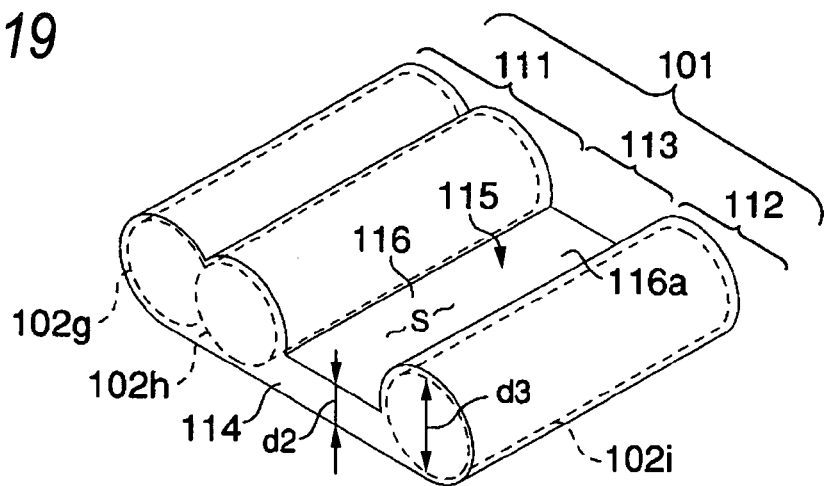
FIG. 19 is an exemplary perspective view of a battery unit according to a seventh embodiment of the present invention.

FIG. 19 shows a seventh exemplary embodiment of the present invention. In the battery unit 100 according to this embodiment, a case 101 contains three cells 102g-102i. The cells 102g-102i may use round cells having a cylindrical outward form. A first part 111 of the case 101 contains two cells 102g and 102h. A second part 112 of the case 101 contains one cell 102i.

The third part 113 of the case 101 has an escape section 115. The escape section 115 is defined by a recess 116 having a bottom 116a. The recess 116 has a form opened to the upper, front and rear sides of the case 101. Due to the recess 116, the third part 113 of the case 101 has a thin wall portion 114. The thickness d2 of the thin wall portion 114 is smaller than the diameter d3 of the cells 102g-102i. The lower surface of the case 101 is a flat plane.

According to this embodiment, at least a part of an electronic component or mechanical component is led to the space S defined by the recess 116 and layered on the bottom 116a, and an electronic apparatus such as a portable computer 1 can be made slimmer.

Figure 20:
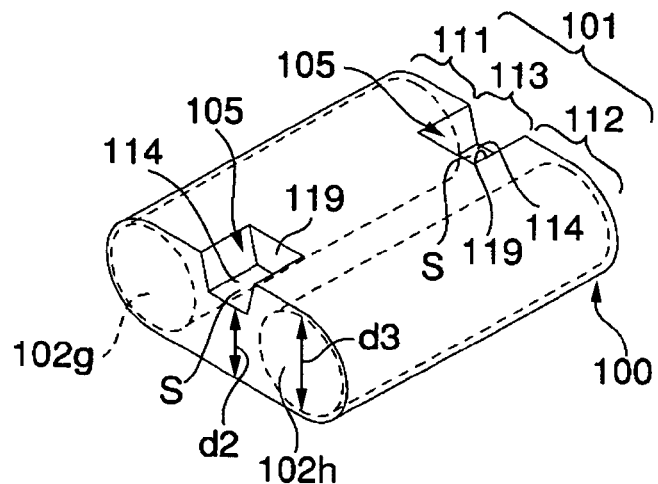
FIG. 20 is an exemplary perspective view of a battery unit according to an eighth embodiment of the present invention.

FIG. 20 shows an eighth exemplary embodiment of the present invention. In the battery unit 100 according to this embodiment, a case 101 contains two cells 102g and 102h. The cells 102g and 102h may use round cells having a cylindrical outward form. A first part 111 of the case 101 contains one cell 102g. A second part 112 of the case 101 contains one cell 102h.

A third part 113 of the case 101 is placed on the same plane as the first and second parts 111 and 112. The third part 113 of the case 101 has a pair of escape sections 115. Each escape section 115 is defined by a cutout 119. One cutout 119 is formed at the corner defined by the upper side and front side of the case 101. The other cutout 119 is formed at the corner defined by the upper side and rear side of the case 101. Each cutout 119 has a bottom 119a. Due to the cutout 119, the third part 113 has a pair of thin wall portions 114. The thin wall portions 114 are thinner than the first and second parts 111 and 112.

According to this embodiment, at least a part of an electronic component or mechanical component is led to the space S defined by the cutout 119 and layered on the bottom 116a, and an electronic apparatus such as a portable computer 1 can be made slimmer.

Figure 21:
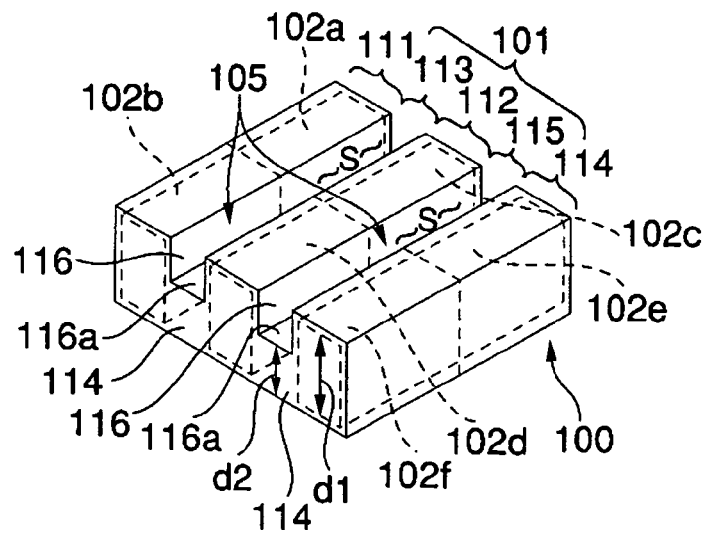
FIG. 21 is an exemplary perspective view of a battery unit according to a ninth embodiment of the present invention.

FIG. 21 shows a ninth exemplary embodiment of the present invention. According to this embodiment, a case 101 of a battery unit 100 has a first part 111, a second part 112, a third part 113, a fourth part 124, and a fifth part 125. The first part 111 contains two cells 102a and 102b. The second part 112 contains two cells 102c and 102d. The fourth part 124 contains two cells 102e and 102f.

The third part 113 is interposed between the first part 111 and second part 112, and connects these two parts 111 and 112. The fifth part 125 is interposed between the second part 112 and fourth part 124, and connects these two parts 112 and 124.

The third and/or fifth parts 113 and 125 have an escape section 115. The escape section 115 is defined by a groove-like recess 116 having a bottom 116a. Due to the recess 116, the third and fifth parts 113 and 125 of the case 101 have a thin wall portion 114. The thin wall portion 114 is thinner than the first, second and fourth parts 111, 112 and 124.

According to this embodiment, at least a part of an electronic component or mechanical component is led to the space S defined by the recess 116 and layered on the bottom 116a, and an electronic apparatus such as a portable computer 1 can be made slimmer.

Electronic apparatuses to mount the battery unit according to the present invention are not limited to a portable computer. The battery unit is applicable to other electronic apparatus such as an electronic notepad and personal digital assistant (PDA) for example.

An "electronic component" is not limited to a pointing device like a touch panel, but should be broadly construed. For example, a keyboard, HDD, DVD drive, PC card, PC card slot, memory card slot, extended memory, LAN module, wireless module, stylus (to input a signal in a pointing device using electrostatic induction), printed circuit board and even connector panel are examples of electronic components. When such an electronic component is mounted in the housing, at least a part of it is led to the escape section of the battery unit, and an electronic apparatus can be made slimmer.

Mechanical components are not limited to a pointing device holding part and a stylus to press a pointing device. For example, a hinge to hold the display unit to the main unit is usable. When such a mechanical component is mounted in the housing, at least a part of it is led to the escape section of the battery unit, and an electronic apparatus can be made slimmer.

Further, in the battery unit according to the present invention, the escape section of the case is not limited to having a thin wall portion thinner than the first and second parts. The escape section is used to avoid interference between the battery unit and electronic component or mechanical component. Therefore, even if a part of the third part of the case is made thicker than the first or second part, as long as the other parts have an escape section, an electronic apparatus can be made slimmer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
a battery unit that comprises
a plurality of cells, and
a case accommodating the plurality of cells, the case comprises
(i) a first part which contains at least a first cell,
(ii) a second part which contains at least a second cell that is different from the first cell contained in the first part, and
(iii) a third part which is located between the first part and the second part, the third part connecting the first part and the second part and containing no cell, the third part having a thickness less than a thickness of the first part and a thickness of the second part;
a housing that comprises a first wall, a second wall including a keyboard mounting part and an area between the keyboard mounting part and a third wall coupled to the first wall and the second wall, and a battery receptacle located between the first wall and the second wall, wherein the battery unit being adapted for placement within the battery receptacle of the housing that is situated directly under the area between the keyboard mounting part and the third wall;
a holding unit adapted to support a component being a pointing device, the holding unit provided in the housing and extending from the second wall into the battery receptacle,
wherein the component at least partially overlaps a portion of the third part of the case in a thickness direction.

2. The electronic apparatus of claim 1, wherein the third part of the case includes a wall having a thickness less than a thickness of each of the plurality of cells.

3. The electronic apparatus of claim 1, wherein in the case, the at least the first cell contained in the first part is electrically connected to the at least the second cell contained in the second part.

4. The electronic apparatus of claim 1, wherein the pointing device includes an input unit exposed via an opening in the second wall of the housing.

5. The electronic apparatus of claim 4, wherein the input unit of the pointing device includes an electric capacity sensing sheet.

6. The electronic apparatus of claim 4, wherein the input unit of the pointing device includes a pressure sensing film.

7. The electronic apparatus of claim 1, wherein an area adjacent to the keyboard mounting part includes a palm rest.

8. An electronic apparatus comprising:
a battery unit that comprises
a plurality of cells, and
a case accommodating the plurality of cells, the case comprises
(i) a first part which contains at least a first cell,
(ii) a second part which contains at least a second cell that is different than the first cell, and
(iii) a third part which is located between the first part and the second part, the third part connecting the first part and the second part and containing no cells, the third part having a thickness less than a thickness of the first part and a thickness of the second part;
a housing that comprises (i) a first wall, a second wall that includes a keyboard mounting part and an area between the keyboard mounting part and a third wall coupled to the first wall and the second wall, and (ii) a battery receptacle located directly under the area between the keyboard mounting part and the third wall and adapted to contain the battery unit; and a holding unit adapted to support a component being a pointing device so that the component at least partially overlaps a portion of the third part of the case in a thickness direction, the holding unit provided in the housing and extending from the second wall into the battery receptacle.

9. The electronic apparatus of claim 8, wherein the third part of the case includes a wall having a thickness less than a thickness of each of the plurality of cells.

10. The electronic apparatus of claim 8, wherein in the case, the at least the first cell contained in the first part is electrically connected to the at least the second cell contained in the second part.

11. The electronic apparatus of claim 8, wherein the pointing device includes an input unit exposed via an opening in the second wall of the housing.

12. The electronic apparatus of claim 11, wherein the input unit of the pointing device includes an electric capacity sensing sheet.

13. The electronic apparatus of claim 11, wherein the input unit of the pointing device includes a pressure sensing film.

* * * * *